United States Patent [19]

George

[11] Patent Number: 4,850,243

[45] Date of Patent: Jul. 25, 1989

[54] UNIFORM STRAIN VIBRATION DAMPER

[75] Inventor: Larry T. George, Greenfield, Ind.

[73] Assignee: Household Manufacturing, Inc., Indianapolis, Ind.

[21] Appl. No.: 145,676

[22] Filed: Jan. 14, 1988

Related U.S. Application Data

[63] Continuation of Ser. No. 870,536, Jun. 4, 1986, abandoned.

[51] Int. Cl.$^4$ ............................................ F16F 15/10
[52] U.S. Cl. .......................................... 74/574; 74/572
[58] Field of Search ................ 74/572, 573 F, 573 R, 74/574

[56] References Cited

U.S. PATENT DOCUMENTS

| | | | |
|---|---|---|---|
| 2,049,133 | 7/1936 | Pierce | 74/574 |
| 2,585,382 | 2/1952 | Guernsey | 74/574 |
| 2,861,472 | 11/1958 | Hansz | 74/574 |
| 3,126,760 | 3/1964 | Pierce | 74/574 |
| 3,196,710 | 7/1965 | Pierce | 74/574 |
| 4,023,438 | 5/1977 | Birkle et al. | 74/574 |
| 4,046,230 | 9/1977 | Troyer | 74/574 |
| 4,095,485 | 6/1978 | Hiersig | 74/574 |
| 4,220,056 | 9/1980 | Bremer | 74/574 |
| 4,224,835 | 9/1980 | Bauer | 74/574 |
| 4,378,865 | 4/1983 | McLean | 74/574 |

FOREIGN PATENT DOCUMENTS

| | | | |
|---|---|---|---|
| 2440364 | 3/1976 | Fed. Rep. of Germany | 74/574 |
| 6605870 | 3/1967 | Netherlands | 74/574 |
| 184971 | 9/1963 | Sweden | 74/574 |
| 485257 | 5/1938 | United Kingdom | 74/574 |
| 688888 | 3/1953 | United Kingdom | 74/574 |
| 828266 | 2/1960 | United Kingdom | 74/574 |
| 828354 | 2/1960 | United Kingdom | 74/574 |
| 841797 | 7/1960 | United Kingdom | 74/574 |
| 1203999 | 9/1970 | United Kingdom | 74/574 |
| 1217506 | 12/1970 | United Kingdom | 74/574 |
| 2100388 | 12/1982 | United Kingdom | 74/574 |

*Primary Examiner*—Vinh Luong
*Attorney, Agent, or Firm*—Woodard, Emhardt, Naughton Moriarty & McNett

[57] ABSTRACT

A damper assembly for use with a rotatable shaft having a hub, an elastic material including an inwardly facing cavity in which the periphery of the hub is received, and an inertial ring including an inwardly facing cavity in which the elastic material is received. The elastic material extending radially-inward along opposite sides of the hub and being sandwiched between the hub and the inertial ring. The elastic material increases in axial width with increasing radial extension, and is maintained in axial compression between the hub and the inertial ring with the compression being uniform in terms of percent based on thickness. As used herein, the requirement of uniform axial compression refers to the compression of the elastic member being a uniform percent compression in terms of the thickness of the elastic member, as opposed to a uniform distance of compression.

4 Claims, 2 Drawing Sheets

UNIFORM STRAIN VIBRATION DAMPER

This application is a continuation of application Ser. No. 870,536, filed June 4, 1986 now abandoned.

BACKGROUND OF THE INVENTION

1. Field of the Invention

This invention relates generally to the field of vibration dampers adapted for damping torsional vibrations in rotating shafts such as the crankshaft of an internal combustion engine, and pertains particularly to a uniform strain damper.

2. Description of the Prior Art

Torsional vibration dampers have been well known in the art. Multi-throw crankshafts of internal combustion engines, for examples, are caused to vibrate torsionally at certain engine speeds because of the forces to which they are subjected during engine operation. Unless such vibrations are damped, the engine may operate roughtly over the range of speeds at which the amplitude of torsional vibration at the crankshaft is high, and the vibration may become so excessive as to cause breakage of the crankshaft or connected parts. In order to prevent the harmful effects of such torsional vibration, it is common practice to secure a vibration damper to one end of the crankshaft. The vibration damper usually takes the form of a mass adapted to rotate with the crankshaft, and secured to the crankshaft by means of a suitable resilient material, such as rubber. When a vibration damper is applied to a crankshaft, it is usually secured to the end of the crankshaft opposite the flywheel. Because of its inertia, natural frequency of vibration and damping in the suspension material itself, it provides an added mass to that end of the crankshaft subject to the greatest torsional vibration and has the effect of maintaining the amplitude of such vibrations within predetermined limits.

The mounting of the damper to the crankshaft or like member may take various forms, and does not form a part of the present invention. Various methods of mouting the damper are well known to persons of ordinary skill in the art, and are exemplified in the prior art patents discussed hereafter. To this extent, the following patents are hereby incorporated by reference into the present description. By way of example, the inertia member in the form of a ring has typically been resiliently connected to the shaft or other rotatable member, such as a pulley, adapted to be connected to the shaft.

A typical form of such dampers has comprised a rotor disk having a hub portion arranged to be secured to the end of a crankshaft or the like, and radially extending annular body flange portion on which is corrotatively mounted an inertia mass yieldably coupled to the hub body flange in a manner to effect attenuation of torsional crankshaft vibrations due to the inertial resistance of the inertia mass. In some of these dampers the coupling has been primarily or entirely elastomeric, i.e., rubber whether natural or artificial or a combination thereof. Other of these prior art dampers have comprises a combination of rubber and viscous coupling means, wherein rubber tuning ring means maintain a shear film spacing between parallel surfaces of the inertia mass and body flange in which biscous damping medium such as a silicone fluid is filled.

The connecting rubber component of vibration dampers of the described type are typically annular in configuration, with the component being relatively thin and extending in a radial direction. The inner hub extends within the rubber component, and the inertia ring typically surrounds the outer surface of the rubber component. In certain prior art devices, the rubber component has been a flat, constant thickness member, but these have the disadvantage of having the outer parts of the member being highly strained. This results in slightly higher damping, but much lower stiffness, fatigue life and abrasion resistance.

Some advantage has been achieved by having the rubber component increase in axial thickness with increasing radial extension. Torsional dampers having such rubber components of varying thickness are shown, for example, in U.S. Pat. Nos. 3,126,760, issued to Pierce on Mar. 31, 1964.

Another variable in the design of prior art damping devices has been the use of compression of the rubber component by the inertia ring. In these prior art devices, however, the compression has not been uniform, resulting in non-uniform strain. For example, in U.S. Pat. No. 4,378,865, issued to McLean on Apr. 5, 1983, there is disclosed a torsional damper in which the rubber component is sandwiched between two discs forming the inertia ring. The rubber component and the inertia discs are described as having "complementary" tapered surfaces, i.e. having the same angle. The rubber component increases in thickness with radial extent. Consequently, compression of the rubber component by the complementary angled surfaces of the inertia discs causes the rubber component to be compressed by the same distance. However, because the rubber varies in thickness, the percentage of compression decreases with radial extent, and there in non-uniform compression of the rubber in the McLean device.

Other examples of a device having complementary angled surfaces for the rubber component and the inertia ring are the devices of U.S. Pat. Nos. 3,196,710 and 2,049,133, issued to Pierce on July 27, 1965 and July 28, 1936, respectively. Similar devices are also shown in U.S. Pat. Nos. 2,585,382, issued to Guernsey on Feb. 12, 1952 and 2,861,472, issued to Hansz on Nov. 25, 1958.

SUMMARY OF THE INVENTION

Briefly describing one aspect of the present invention there is provided a damper assembly for mounting on a rotatable shaft and including a hub, an elastic member received about the periphery of the hub and extending inwardly along both sides of the hub, and an inertial ring received about and extending inwardly along both sides of the elastic member. The elastic member incrases in axial width with increasing radial extent, and is held within the inertial ring in a state of uniform axial compression throughout the radial extent of the elastic member. The elastic member may be bonded to either or both of the hub and the inertial ring.

It is an object of the present invention to provide a damper assembly useful in conjunction with a rotatable shaft such as a crankshaft of an internal combustion engine.

A further object of the present invention is to provide a damper assembly which has superior characteristics regarding stiffness, fatigue life and abrasion resistance.

It is another object of the present invention to provide a damper assembly which has uniform strain properties.

A further object of the present invention is to provide a damper assembly which is of simple construction and readily assembled.

Further objects of the present invention will be apparent from the description of the preferred embodiment which follows.

DESCRIPTION OF THE PREFERRED EMBODIMENT

Figure 1:
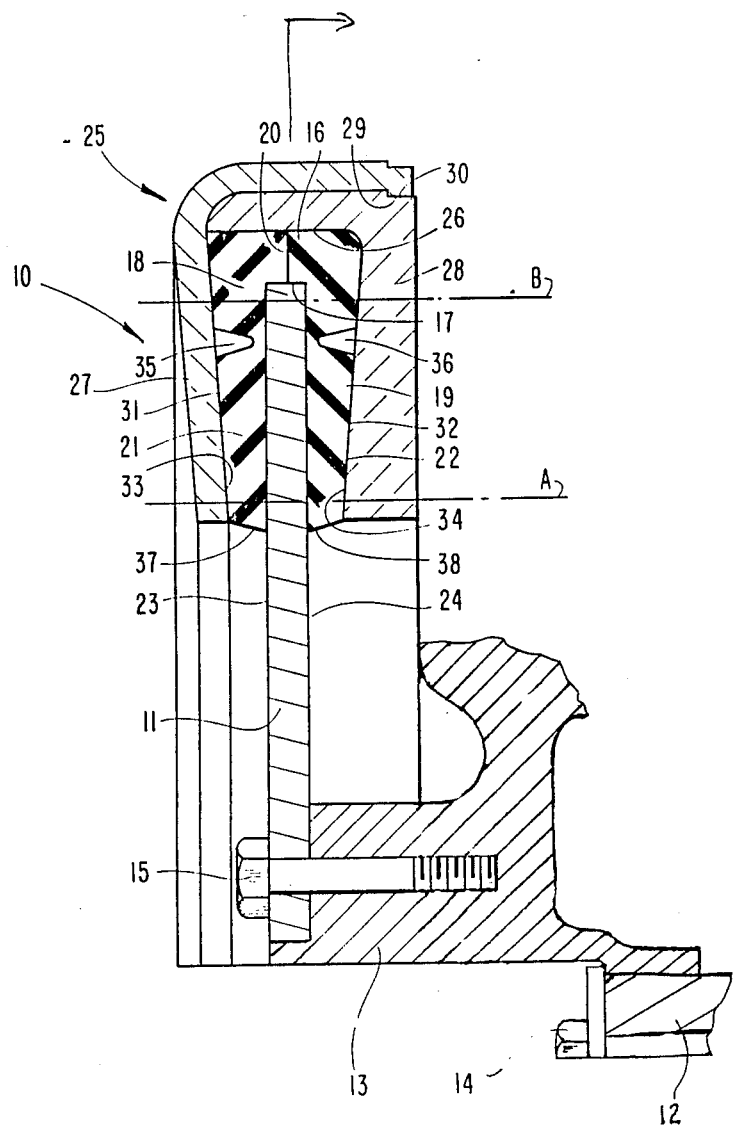
FIG. 1 is a side cross-sectional view of a damper assembly constructed in accordance with the present invention, and shown mounted upon a shaft.
Figure 2:
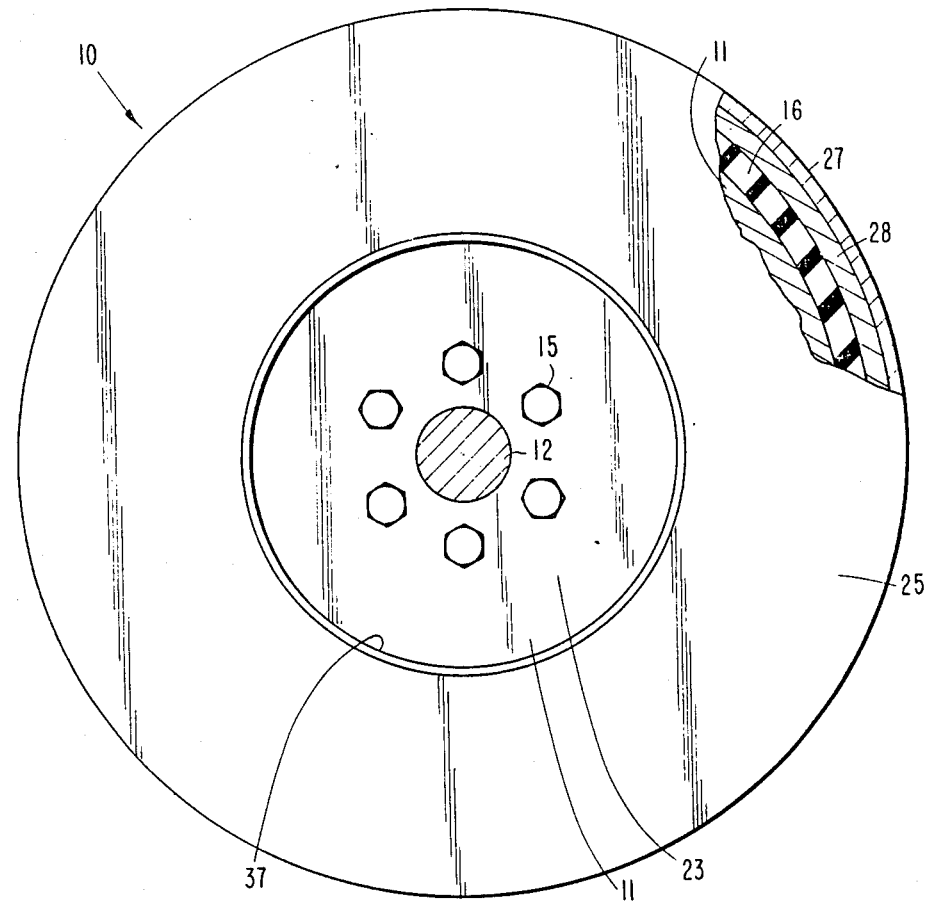
FIG. 2 is a front, elevational view of the damper assembly of FIG. 1.
Figure 3:
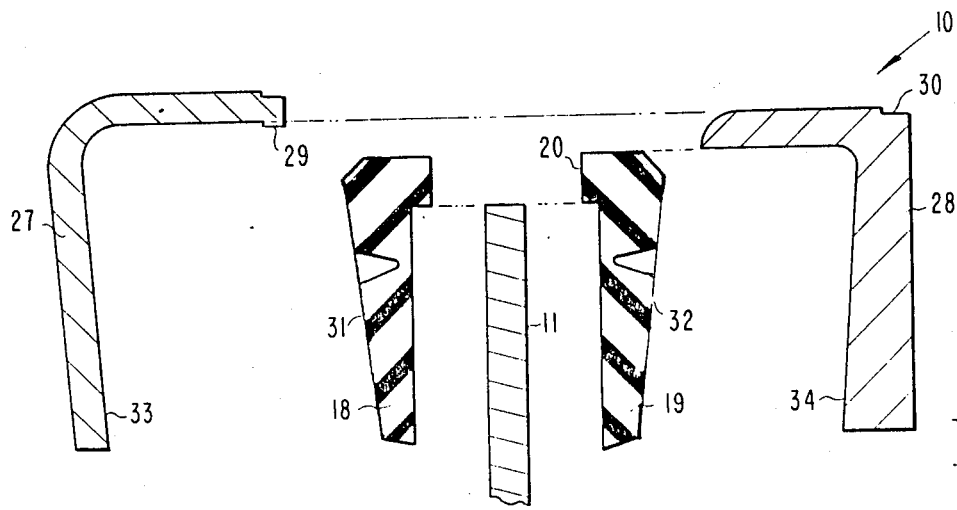
FIG. 3 is an exploded view of the assembly of FIG. 1, showing in particular the different angles of components used to obtain uniform percent compression of the elastic member.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Dampler assemblies have been well known in the prior art for use in various capacities, such as for use with a rotatable shaft. The present invention provides a damper assembly which has superior characteristics, and which is of simple construction and readily assembled.

The damper assembly 10 in FIG. 1 includes a hub 11 which is mountable to a rotatable shaft in a variety of conventional ways. The hub 10 includes a radially inner portion adapted for attachment to the shaft, and a radially outer portion.

The manner of mounting the hub to the shaft may vary with the application of the damper and the construction of the unit to which the damper is to be mounted. The particular manner of mounting does not form a part of the present invention, and various means are well known to persons of ordinary skill in the art. By way of example, the hub 11 is shown mounted to a shaft 12 by securement through pulley 13 attached to the shaft 12. The securement of the hub 11 is accomplished with bolts 15 extending through aligned apertures in the hub 11 and into pulley 13. The pulley 14 may be attached to the shaft 12 in a variety of ways, and is typically secured by a press fit on the shaft and further secured with a washer and bolt 14.

The damper assembly further includes an elastic member 16 defining a radially-inward facing cavity 17 within which the outer periphery of the hub is received. The elastic member preferably comprises first and second elastic components 18 and 19 which abut in a plane 20. The elastic member 16 includes first and second portions 21 and 22 which extend radially-inward along the sides 23 and 24 of the hub 11.

Surrounding the elastic member 16 is an inertial ring 25. This ring defines a radially-inward facing cavity 26 within which is received the elastic member 16. The elastic member therefore extends between and is sandwiched by the hub 11 and the inertial ring 25. The inertial ring 25 preferably comprises first and second inertial plates 27 and 28 which are connected together. This interconnection may be provided in a variety of ways, including the preferred construction shown in FIG. 1 in which the two plates have a generally L-shaped cross section, and the second plate is received within the first plate. The first plate includes a radially-inward extending lip 29 which is received within a complementary shaped recess 30 in the second plate, providing a firm engagement between the two plates.

The elastic member 16 has an increasing axial width in the radially-outward direction. The hub 11 preferably comprises a flat disc, and the elastic member includes a complementary shaped interior cavity for reception against the hub. The outer surfaces 31 and 32 of the elastic member are angled to provide the increasing axial width to the first and second portions extending along the hub as shown particularly in FIG. 1.

The interior cavity of the inertial ring is shaped to receive the varying width elastic member. The elastic member 16 is retained within the inertial ring in a state of compression. The extent of axial compression is uniform for the radial extent of the portions 21 and 22 extending between the hub 11 and the inertial ring. This compression is uniform in the sense that the percentage by which the elastic member is compressed, as a ratio to the thickness of the elastic member at that location, is the same for the various radial positions of the elastic member. For example, the percentage of compression of the elastic member at radial position A is the same as the percentage of compression at radial position B, as well as the various locations in between.

It is a particular feature of the present invention that the inwardly facing surfaces 33 and 34 of the inertial ring are angled differently than the unconstrained surfaces of the elastic member in the following way to accomplish this uniform compression. The elastic member and inertial ring are sized such that upon assembly of the ring over the elastic member the elastic member is maintained in a state of axial compression. The uncompressed, or unconstrained, configuration of the elastic member is different than the configuration upon assembly. The unconstrained surfaces of the elastic member are angled outwardly from the hub at a greater angle than the angle of the inwardly facing surfaces 33 and 34. When the damper is then assembled, the surfaces 31 and 32 of the elastic member are axially displaced a greater amount with increasing radial distance from the shaft. The configuration of the unconstrained elastic member and of the inertial ring are therefore selected to have the percent axial compression of the elastic member be uniform for the radial extent of the elastic member between the inertial ring and the hub. The precise angles to be used can be readily determined based upon thicknesses and radial location of the elastic material and the desired angle of the outer surfaces of the elastic material in the assembled unit. In a typical embodiment the difference in angles for the unconstrained elastic material and the inner surfaces of the inertial ring is about 2°–4°.

As used herein, the requirement of uniform axial compression refers to the compression of the elastic member being a uniform percent compression in terms of the thickness of the elastic member, as opposed to a uniform distance of compression. Because the elastic member has a varying cross section, these two types of compression are not the same. Prior art devices, as shown for example in the previously referenced McLean patent, use surfaces of the elastic member and inertial ring which are at the same angle. Upon assembly this results in the elastic member being displaced by the same distance, but not by the same amount as a percent of the thickness of the elastic member. This results in nonuniform preload or compression which the prior art shows will load to performance and durability deficiencies.

Assembly of the damper is achieved in conventional fashion. The molded rubber or other elastic components 18 and 19 are assembled onto the hub and the inertial plates are assembled thereover. Assembly may be accomplished with or without the use of conventional lubricants which may be applied to the surfaces of the elastic components, but lubricants are not requird and is not preferred if it would interfere with subsequent bonding. Compression relief grooves 35 and 36 are preferably provided in the outwardly facing surfaces to facilitate assembly of the unit. These grooves allow maximum inner bond surface and smooth stress distribution for longer life of the assembly, and such grooves accommodate subsequent movement or flow of the elastic material. Further, placing the gaps on the outside is desirable since there is more surface contact on the outside and the ability to carry load is dependent upon the surface area in contact.

Upon assembly, the elastic member may remain unattached to the hub and inertial ring, or may be bonded to the metal surfaces in conventional fashion. Bonding may also be desirable since it prevents the entry of dirt into the assembly. In addition, the inner surfaces 37 and 38 are tapered to divert dirt from the assembly. If bonding is desired, the present design permits the bonding to all metal surfaces to be accomplished at the same time. Certain prior art designs have included a first step of molding the elastic member onto the hub, in which case bonding of the elastic member to the surrounding inertial ring would have to be done in a second, separate step which could adversely affect the bond of the elastic member to the hub.

The damper assembly of the present invention provides a superior unit in terms of characteristics, life and assembly. The use of an elastic member having an increaasing thickness with radial extent avoids the disadvantage of constant thickness designs in which the outer parts of the elastic member are highly strained, resulting in lower stiffness, fatigue life and abrasion resistance. The present invention optimizes elastomertic properties and daper effectiveness, and applies uniform load (reducing local overstress) due to the varying thickness of the elastic and the application of a uniform axial compression to the elastic by the inertial ring.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vibration damper assembly for a rotatable shaft, which comprises:
    a hub having two sides and including a radially inner portion and a radially outer, peripheral portion;
    an annular, elastic member defining a radially-inward facing cavity within which is received the peripheral portion of said hub, said elastic member including first and second portions extending radially inward along and adjacent both sides of said hub, each of the first and second portions of said elastic member having an increasing thickness from one end to another end in the radially-outward direction, the first and second portions having a first thickness associated with a non-compressed condition and a second thickness associated with a compressed condition, each of the second, compressed thickness for each radial position of said elastic member being the same percentage of the non-compressed thickness as for the other radial positions of said elastic member;
    an inertia ring defining a radially-inward facing cavity within which is received said elastic member and the peripheral portion of said hub, said inertia ring comprising first and second inertia plates, the first plate extending adjacent the first portion of said elastic member and the second plate extending adjacent the second portion of said elastic member and being secured to the first plate; and,
    compression means for compressing the first and second portions of said elastic member between said hub and said inertia ring to maintain each of the first and second portions in a state of axial compression, said compression means comprising means for securing said first plate to said second plate abut said elastic member and said hub with the spacing between radially-aligned portions of the first and second plates and said hub being less than the non-compressed thickness of the respective portion of the first and second portions of said elastic member held therebetween, wherein unconstrained surfaces of said elastic member are angled outwardly from said hub at a greater angle than an angle of inwardly facing surfaces of said inertia ring, said compression means including means for securing together said first and second plates in position to compress the respective portions of the first and second portions of said elastic member to maintain said first and second portions in a state of axial compression which is uniform in percent compression for the radial extent of the first and second portions of said elastic member between said hub and said inertia ring.

2. The assembly of claim 1 in which said elastic member is bonded to at least one of said hub and said inertia ring.

3. The assembly of claim 1 in which said hub comprises a flat disc.

4. The assembly of claim 3 in which said elastic member is bonded to at least one of said hub and said inertia ring.

* * * * *